(12) United States Patent
Klinghult et al.

(10) Patent No.: US 7,956,770 B2
(45) Date of Patent: Jun. 7, 2011

(54) DATA INPUT DEVICE AND PORTABLE ELECTRONIC DEVICE

(75) Inventors: Gunnar Klinghult, Lund (SE); Mats Kleverman, Helsingborg (SE); Magnus Jendbro, Staffanstorp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1002 days.

(21) Appl. No.: 11/770,308

(22) Filed: Jun. 28, 2007

(65) Prior Publication Data

US 2009/0002205 A1    Jan. 1, 2009

(51) Int. Cl.
*H03M 11/00* (2006.01)

(52) U.S. Cl. ............ 341/20; 341/22; 345/168; 345/156; 310/319; 200/512

(58) Field of Classification Search .................. 341/20, 341/22; 345/701, 157, 156, 184, 179; 310/319; 200/512; 324/156
See application file for complete search history.

(56) References Cited

U.S. PATENT DOCUMENTS

| | | | |
|---|---|---|---|
| 4,066,851 A | 1/1978 | White et al. | |
| 6,809,462 B2* | 10/2004 | Pelrine et al. | 310/319 |
| 7,034,802 B1 | 4/2006 | Gettemy et al. | |
| 7,332,688 B2* | 2/2008 | Browne et al. | 200/512 |
| 7,567,681 B2* | 7/2009 | Pelrine et al. | 381/191 |
| 2002/0054060 A1* | 5/2002 | Schena | 345/701 |
| 2002/0084989 A1 | 7/2002 | Harif | |
| 2002/0130673 A1* | 9/2002 | Pelrine et al. | 324/727 |
| 2003/0098845 A1 | 5/2003 | Hanson et al. | |
| 2003/0231197 A1 | 12/2003 | Janevski | |
| 2009/0207129 A1* | 8/2009 | Ullrich et al. | 345/156 |

OTHER PUBLICATIONS

International Search Report and Written Opinion dated Apr. 4, 2008 issued in corresponding PCT application No. PCT/EP2007/062640, 12 pages.

* cited by examiner

*Primary Examiner* — Albert K Wong
(74) *Attorney, Agent, or Firm* — Harrity & Harrity, LLP

(57) ABSTRACT

Embodiments include a data input device and a portable electronic device including such a data input device. The data input device may include a key sensing mechanism and a solid material layer provided above the key sensing mechanism. The solid material layer may include a least one cavity that may go through the whole of the solid material layer. The cavity may include an electroactive polymer and two electrodes for providing a key that may be changed in shape based on an applied voltage. One embodiment may also allows the registering of inputs in the key sensing mechanism based on a user pressing down the electroactive polymer on the key sensing mechanism.

21 Claims, 2 Drawing Sheets

DATA INPUT DEVICE AND PORTABLE ELECTRONIC DEVICE

TECHNICAL FIELD

Embodiments disclosed herein may relate to the field of portable electronic devices and more particularly may relate to the provision of a data input device and a portable electronic device including a data input device.

DESCRIPTION OF RELATED ART

Portable electronic devices like cellular phones are becoming smaller and smaller in size. This also leads to the reduction in size of elements provided on them such as keys and keypads. This also means that it may be hard for users to input data. A user of a portable communication device may furthermore not need to use all the keys that are provided.

SUMMARY

One or more embodiments disclosed herein may be directed to using an electroactive polymer in a data input device in order to enable the provision of keys that can be raised in relation to the environment in which they are provided.

A first aspect of one embodiment may be directed towards a data input device that may include: a key sensing mechanism, a solid material layer provided above the key sensing mechanism, wherein the solid material layer may include a least one cavity going through the whole of the solid material layer, and wherein the cavity may include an electroactive polymer and two electrodes for providing a key that can be changed in shape based on an applied voltage and register inputs in the key sensing mechanism based on a user pressing down the electroactive polymer on the key sensing mechanism.

A second aspect of one embodiment may be directed towards a data input device including the features of the first aspect, wherein the electroactive polymer and the key sensing mechanism are transparent.

A third aspect of one embodiment may be directed towards a data input device including the features of the second aspect, and may further include a display below the key sensing mechanism.

A fourth aspect of one embodiment may be directed towards a data input device including the features of the first aspect, wherein the solid material layer may include a number of cavities, each having electroactive polymer and electrodes.

A fifth aspect of one embodiment may be directed towards a data input device including the features of the fourth aspect, wherein the cavities are provided in a structure and the key sensing mechanism is arranged to detect a key press through providing data indicating a position in the structure based on pressure applied by the electroactive polymer of a cavity on an area in the key sensing mechanism.

A sixth aspect of one embodiment may be directed towards a data input device including the features of the first aspect, wherein the electroactive polymer is an ionic electroactive polymer.

A seventh aspect of one embodiment may be directed towards a data input device including the features of the first aspect, and may further include an elastic shielding layer above the solid material layer and covering the cavity.

An eighth aspect of one embodiment may be directed towards a data input device including the features of the first aspect, wherein the electroactive polymer is surrounded by a gel formed electrolyte.

A ninth aspect of one embodiment may be directed towards a data input device including the features of the first aspect, wherein the electrodes are provided opposite each other on the walls of the cavity.

A tenth aspect of one embodiment may be directed towards portable electronic device that may include: a data input device having a key sensing mechanism, a solid material layer provided above the key sensing mechanism, wherein the solid material layer may include a least one cavity going through the whole of the solid material layer, wherein the cavity may include an electroactive polymer and two electrodes for providing a key that can be changed in shape based on an applied voltage and register inputs in the key sensing mechanism based on a user pressing down the electroactive polymer on the key sensing mechanism.

An eleventh aspect of one embodiment may be directed towards a portable electronic device including the features of the tenth aspect, wherein the electroactive polymer and the key sensing mechanism are transparent A twelfth aspect of one embodiment may be directed towards a portable electronic device including the features of the eleventh aspect, and may further include a display below the key sensing mechanism.

A thirteenth aspect of one embodiment may be directed towards a portable electronic device including the features of the tenth aspect, wherein the solid material layer may include a number of cavities, each having electroactive polymer and electrodes.

A fourteenth aspect of one embodiment may be directed towards a portable electronic device including the features of the thirteenth aspect, wherein the cavities are provided in a structure and the key sensing mechanism is arranged to detect a key press through providing data indicating a position in the structure based on pressure applied by the electroactive polymer of a cavity on an area in the key sensing mechanism.

A fifteenth aspect of one embodiment may be directed towards a portable electronic device including the features of the tenth aspect, wherein the electroactive polymer is an ionic electroactive polymer.

A sixteenth aspect of one embodiment may be directed towards a portable electronic device including the features of the tenth aspect, and may further include an elastic shielding layer above the solid material layer and covering the cavity.

A seventeenth aspect of one embodiment may be directed towards a portable electronic device including the features of the tenth aspect, wherein the electroactive polymer is surrounded by a gel formed electrolyte.

An eighteenth aspect of one embodiment may be directed towards a portable electronic device including the features of the tenth aspect, wherein the electrodes are provided opposite each other on the walls of the cavity.

A nineteenth aspect of one embodiment may be directed towards a portable electronic device including the features of the tenth aspect, and may further include a control unit arranged to receive location detection data from the key sensing mechanism corresponding to a pressing down of the electroactive polymer in a cavity on the key sensing mechanism and providing a voltage to be applied on the electrodes of the electroactive polymer in a cavity based on this pressing down in order to change the shape of the electroactive polymer in question.

A twentieth aspect of one embodiment may be directed towards a portable electronic device including the features of the tenth aspect, wherein it is a portable communication device.

A twenty-first aspect of one embodiment may be directed towards a portable electronic device including the features of the twentieth aspect, wherein it is a cellular phone.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

Embodiments will now be described in more detail in relation to the enclosed drawings, in which.

DETAILED DESCRIPTION OF EMBODIMENTS

Embodiments disclosed herein may enable a user to use the keys of interest in a simple manner, without the user having to look at a keypad in order to select the keys to use. Materials have evolved that change shape based on applied electrical voltages. These materials are electroactive polymers. These materials have been suggested for use in for instance the field of biomimetics.

A portable electronic device according to one embodiment will now be described in relation to a cellular phone, which is one embodiment of such a device. The portable electronic device may be a portable communication device of some other type, like a cordless phone, a communication module, a PDA or any other type of portable device communicating with radio waves. It can also be a gaming machine, a notepad or any other type of portable electronic device.

Figure 1:
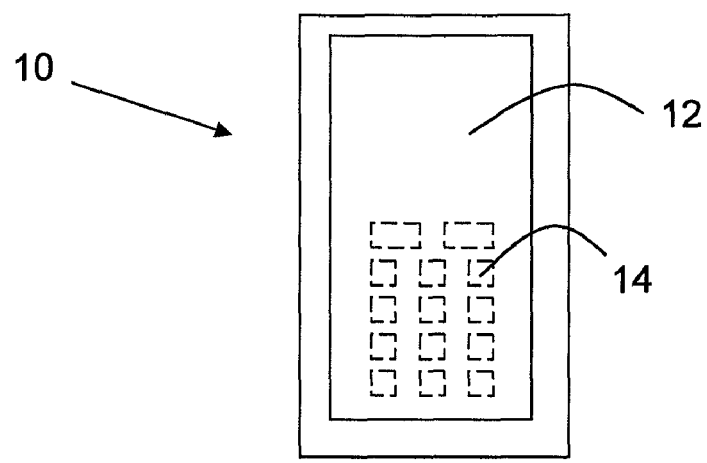
FIG. 1 schematically shows a front view of an exemplary portable electronic device in the form of a cellular phone having a data input device according to one embodiment, FIG. 2 schematically shows a side view of the exemplary data input device provided above a display, FIG. 3 schematically shows a side view of one exemplary key provided in the data input device in a normal non-raised mode, FIG. 4 schematically shows a side view of the exemplary key provided in the data input device in a raised mode.

FIG. 1 schematically shows a front view of a phone according to one embodiment. The phone 10 may include display 12. The display 12 here may include an area where a data input device 14 in the form of a keypad is provided. When the data input device 14 is touched in an area where a key is provided, information corresponding to this key may be registered by the data input device 14 and entered into the phone 10. The data input device 14 may have a special configuration, which will be described below.

Figure 2:
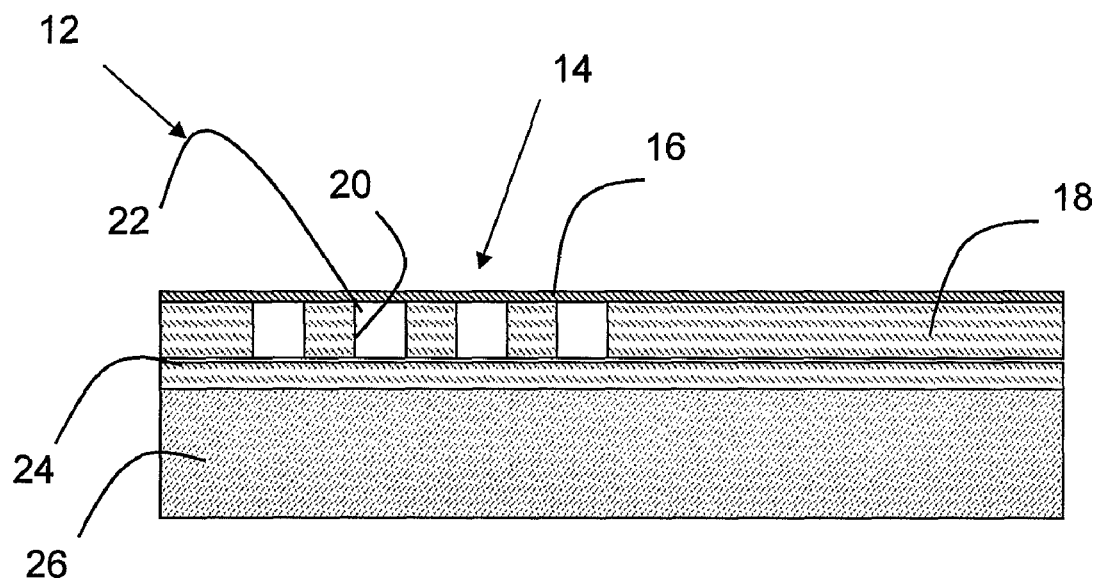

FIG. 2 schematically shows a side view of the structure of an embodiment of an exemplary data input device 14 according to one embodiment. The device 14 may include a transparent elastic shielding layer 16 having an upper side facing the exterior of the phone. This layer may be flexible and may be provided through silicone. This layer 16 may be the part of the phone that a user touches when entering information. The shielding layer 16 may have a bottom side attached to an upper side of a solid material layer 18. The solid material layer may be made of a solid plastics material like PET. The solid material layer 18 may include a number of cavities 20, where there may be a cavity 20 provided for each key in the keypad that is to be provided. Each cavity 20 here may go through the whole of the solid material layer 18. Each such cavity 20 may also be filled with an electroactive polymer 22. Below the solid material layer 18 there may be a key sensing mechanism that may touch input sensing layer combination 24, which may be provided through a resistive or a capacitive touch panel. In the case of a resistive touch panel this combination may be provided through a first elastic electrically conducting layer and a second electrically conducting layer that are distanced from each other. These may both be provided in the form of ITO films. Each cavity 20 may be formed as a box bounded by walls provided through the solid material layer 18, a bottom provided by the touch input sensing layer combination 24 and a top provided by the shielding layer 16. The bottom, which may be made up of the first elastic electrically conducting layer of the touch input sensing layer combination 24, may be less flexible than the shielding layer 16, i.e. it may not be as elastic as the shielding layer 16. The cavities 20 with electroactive polymers 22 and the touch input sensing layer combination 24 may form a keypad with a number of keys. Below the touch input sensing layer combination 24 there may be a display 26, which may be a liquid crystal display in order to display information relating to the keys.

Figure 3:
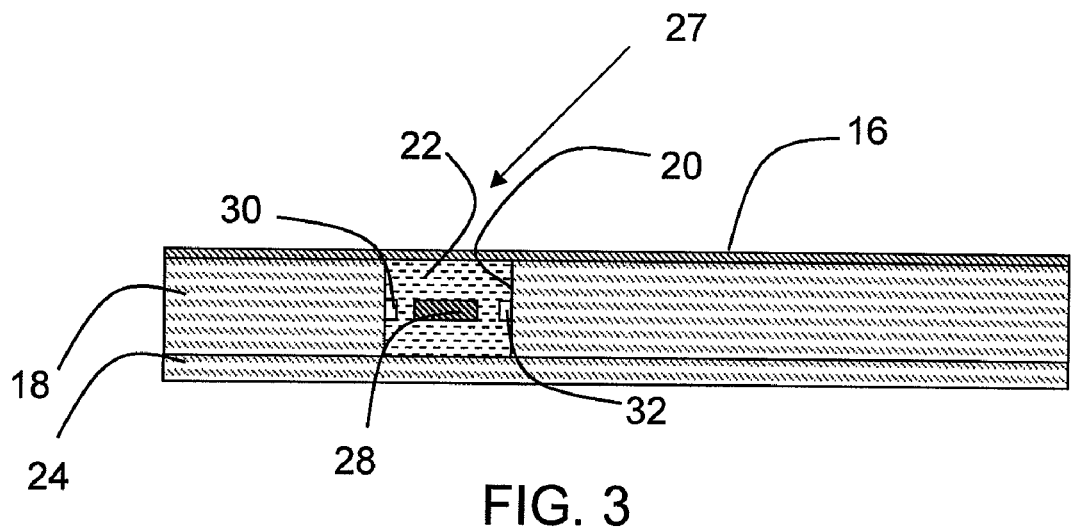
Figure 4:
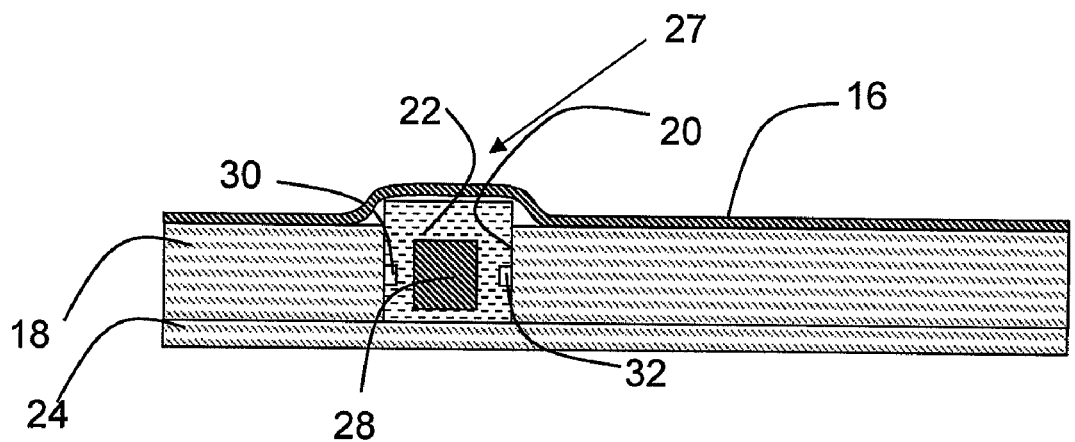

FIGS. 3 and 4 schematically show an exemplary side views of one key 27 provided in the data input device in a normal non-raised mode as well as in a raised mode. The cavity 20 may be, as was mentioned before filled, and may be completely filled, with an electroactive polymer 28. This polymer 28 may be provided in gel form and may be surrounded by an electrolyte 22 that may also be in the form of a gel. The electrolyte 28 may be provided as a shell in order to protect the electroactive polymer 28. In the cavity 20 there may furthermore be a first and a second electrode 30 and 32, where the first electrode 30 may be connected to one of the walls of the cavity 20, while the second may be connected to a second opposing wall. Therefore these electrodes 30 and 32 may be provided opposite each other. By applying a voltage between these two electrodes 30 and 32, the electroactive polymer 22 may react and changes its shape. Because the shielding layer 16 may be more flexible than the bottom of the cavity and the walls are solid, the change in shape may be made only in relation to this shielding layer 16, which may lead to the polymer 28 expanding or contracting and thus raising or lowering the flexible shielding layer 16 so that a raised or lowered key 27 may be provided.

In this way a raised key 27 may be provided, which may enable a user to more easily locate and use the key that may be of interest for him/her to use. This may be of advantage in keypads that are small and where the number of different keys are many. This may also provide a user with tactile feedback of the key.

The electroactive polymer may be an ionic electroactive polymer such as an Ionic Polymer Gel. However it may also be an Ionomeric Polymer-Metal Composite or a Carbon Nanotube.

Figure 5:
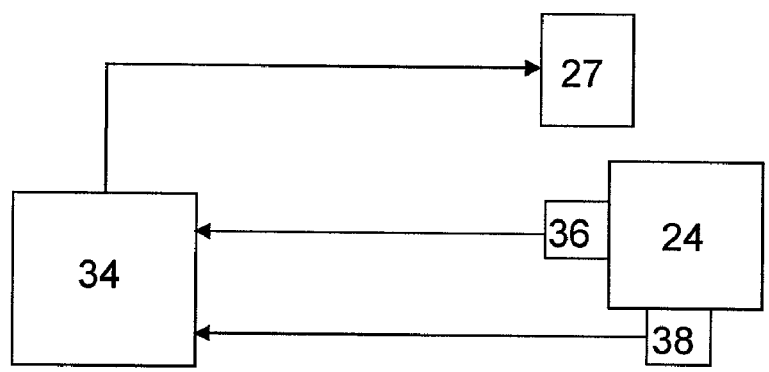
FIG. 5 shows a block schematic of units in the exemplary portable electronic device provided in order to raise a key in the data input device.

In order to provide an example of use of the electroactive polymer, according to one embodiment, reference is now being made to FIG. 5, which shows a block schematic of exemplary units in the portable electronic device that may be provided in order to raise or lower a key in the data input device.

Here there is shown a control unit 34, which may be connected to the touch input sensing combination 24 via detecting elements 36 and 38 as well as to the cavities, here indicated by the single key 27 mentioned above.

As a user presses a key on the keypad, for instance key 27, the electroactive polymer and surrounding electrolyte may be forced down on an area of the underlying touch input sensing layer combination 24 that is aligned with the cavity through user pressure applied on the shielding layer above a cavity. This may cause the electroactive polymer and surrounding electrolyte in the cavity to exert pressure on the touch input sensing layer combination 24, where in the case of a resistive touch panel, the two electrically conducing layers may make contact with each other. The position in a structure, often a matrix provided in the layer may be detected by the detection elements 36 and 38. These elements 36 and 38 may be arranged to detect the position according to columns and rows. Location detection data regarding the position in the structure may be provided to the control unit 34. It may be possible that the selection is made in relation to a music playing function of the device. The control unit 34 may recognize the position and may determine which selection has been made. In relation to this selection it may decide to raise one or more of the keys associated with the selected function, for instance a key that is to provide a PLAY button. The control unit 34 therefore may locate the key that is to be a PLAY button and provides a voltage signal to be provided to the electrodes of the electroactive polymer in the cavity which is to act as the key 27. This may in turn raise the key 27 and now it may be used more easily by the user of the device, since it has been raised in relation to the environment, i.e. in relation to the surface of the phone as well as in relation to at least some of the keys of the keypad.

The data input device need not be provided in relation to a display, but can be provided on its own. Naturally it is then not necessary with transparent layers, which may be the case if the device of one embodiment would be provided for use in a touch screen.

It is furthermore possible that there may be different modes, where some keys in a keypad may be raised while others are not. In one mode no keys may be raised. It is also possible to lower keys that should not be used. It is also possible to combine the raising of keys with illumination so that a user can more easily determine which keys he/she should use. There may also be provided domes between touch input combination and cavities, where the electroactive polymer acts on the dome, which in turn acts on the key sensing mechanism. In this case it should also be realised that the key sensing mechanism need not be provided through a touch input sensing layer combination, but other mechanisms may be used.

It is furthermore possible with flexible walls of the cavity so that expansion can take place sideways. In this way it may be possible to enlarge the size of a key sideways. Depending on the nature of the electroactive polymer the cavity may furthermore only be filled with electroactive polymer without any surrounding electrolyte.

One embodiment may allow the shape of keys to be changed, which may enable a user to more easily locate and use a key that is of interest for him/her to use. This may also provide him/her with tactile feedback of the key.

In the data input device there may be spacer layers provided between the solid material layer and the key sensing mechanism as well as between the key sensing mechanism and the display layer. Therefore, it should be realized that the present invention is only to be limited by the following claims.

The invention claimed is:

1. A data input device comprising:
a key sensing mechanism; and
a solid material layer provided directly above said key sensing mechanism,
where said solid material layer includes at least one cavity going through the whole of said solid material layer, and
where said cavity comprises an electroactive polymer and two electrodes for providing a key that can be changed in shape based on an applied voltage and register inputs in the key sensing mechanism based on a user pressing down the electroactive polymer on the key sensing mechanism.

2. The data input device according to claim 1, where the electroactive polymer and the key sensing mechanism are transparent.

3. The data input device according to claim 2, further comprising:
a display below said key sensing mechanism.

4. The data input device according to claim 1, where said solid material layer comprises a number of cavities, each having electroactive polymer and electrodes.

5. The data input device according to claim 4, where the cavities are provided in a structure, and the key sensing mechanism is to detect a key press through providing data indicating a position in the structure based on pressure applied by the electroactive polymer of a cavity on an area in the key sensing mechanism.

6. The data input device according to claim 1, where the electroactive polymer is an ionic electroactive polymer.

7. The data input device according to claim 1, further comprising:
an elastic shielding layer above said solid material layer and covering said cavity.

8. The data input device according to claim 1, where the electroactive polymer is surrounded by a gel-formed electrolyte.

9. The data input device according to claim 1, where the electrodes are provided opposite each other on the walls of the cavity.

10. A portable electronic device comprising:
a data input device including:
a key sensing mechanism, and
a solid material layer provided directly above said key sensing mechanism, where said solid material layer includes at least one cavity going through the whole of said solid material layer, and
where said cavity comprises an electroactive polymer and two electrodes for providing a key that can be changed in shape based on an applied voltage and register inputs in the key sensing mechanism based on a user pressing down the electroactive polymer on the key sensing mechanism.

11. The portable electronic device according to claim 10, where the electroactive polymer and the key sensing mechanism are transparent.

12. The portable electronic device according to claim 11, further comprising:
a display below said key sensing mechanism.

13. The portable electronic device according to claim 10, where said solid material layer comprises a number of cavities, each having electroactive polymer and electrodes.

14. The portable electronic device according to claim 13, where the cavities are provided in a structure and the key sensing mechanism is to detect a key press through providing data indicating a position in the structure based on pressure applied by the electroactive polymer of a cavity on an area in the key sensing mechanism.

15. The portable electronic device according to claim 10, where the electroactive polymer is an ionic electroactive polymer.

16. The portable electronic device according to claim 10, further comprising:
an elastic shielding layer above said solid material layer and covering said cavity.

17. The portable electronic device according to claim 10, where the electroactive polymer is surrounded by a gel-formed electrolyte.

18. The portable electronic device according to claim 10, where the electrodes are provided opposite each other on the walls of the cavity.

19. The portable electronic device according to claim 10, further comprising:
a control unit to:
receive location detection data from the key sensing mechanism corresponding to a pressing down of the electroactive polymer in a cavity on the key sensing mechanism, and
provide a voltage to be applied on the electrodes of the electroactive polymer in a cavity based on this pressing down in order to change the shape of the electroactive polymer in question.

20. The portable electronic device according to claim 10, where the portable electronic device includes a portable communication device.

21. The portable electronic device according to claim 20, where the portable electronic device includes a cellular phone.

* * * * *